United States Patent [19]

Fraleigh et al.

[11] 4,248,768
[45] Feb. 3, 1981

[54] SILOXANE ELASTOMERS CONTAINING MANGANOUS OXIDE

[75] Inventors: Ronald M. Fraleigh; James A. Marinik, both of Midland, Mich.

[73] Assignee: Dow Corning Corporation, Midland, Mich.

[21] Appl. No.: 16,870

[22] Filed: Mar. 2, 1979

[51] Int. Cl.$^3$ ............................................. C08K 3/22
[52] U.S. Cl. ........................ 260/45.75 R; 260/375 B
[58] Field of Search ................ 260/45.75 R, 375 B; 428/447

[56] References Cited

U.S. PATENT DOCUMENTS

| | | | |
|---|---|---|---|
| 2,593,817 | 4/1952 | Waggoner | 260/37 SB |
| 2,875,098 | 2/1959 | Blatz | 260/37 SB |
| 3,137,670 | 6/1964 | Maneri | 260/37 SB |
| 3,162,722 | 12/1964 | Bartos | 260/37 SB |
| 3,488,319 | 1/1970 | Miller | 260/37 SB |
| 3,692,737 | 9/1972 | Laur | 260/37 SB |
| 3,821,140 | 6/1974 | Milbert | 260/37 SB |
| 3,860,554 | 1/1975 | Bruns | 260/37 SB |
| 4,087,399 | 5/1978 | Hamada et al. | 260/37 SB |

OTHER PUBLICATIONS

Handbook of Chemistry & Physics–1959, Chemical Rubber Pub. Co., Cleveland, Ohio; pp. 604 and 605.

*Primary Examiner*—V. P. Hoke
*Attorney, Agent, or Firm*—Roger H. Borrousch; Edward C. Elliott

[57] ABSTRACT

Siloxane compositions comprising 100 parts by weight of polydiorganosiloxane, 10 to 100 parts by weight of reinforcing silica filler, and 0.1 to 5 parts by weight of manganous oxide are elastomeric bases. When further compounded with organic peroxide and optional additives and cured, the finished products exhibit improved heat stability. If flame-retardant additives are used, the finished products exhibit improved flame-retardancy. The manganous oxide is a purified material having a maximum particle size of 15 micrometers.

8 Claims, No Drawings

SILOXANE ELASTOMERS CONTAINING MANGANOUS OXIDE

BACKGROUND OF THE INVENTION

1. Field of the Invention

This invention relates to siloxane elastomer compositions containing manganous oxide.

2. Description of the Prior Art

Electrical insulation based on siloxane elastomers has been well accepted due to the inherent heat stability of the polydiorganosiloxane used. Nevertheless, much work has been done to improve the characteristics of siloxane elastomers to make them even more suitable as electrical insulation. Additives have been discovered to improve many of the properties of siloxane elastomers including heat stability and flame retardancy.

In U.S. Pat. No. 3,137,670, Maneri discloses the use of certain isolated metallic oxides and hydroxides as excellent heat stability additives in place of the iron oxide and rare earth metal oxides already known. One of the compounds listed as useful is manganese dioxide.

In U.S. Pat. No. 3,162,722, Bartos discloses new electrical insulation components and a method for employing the components together to give improved insulation. One of the components is a diorganopolysiloxane containing a metallic oxide filler. The metallic oxide filler consists of oxides of metals ranging from aluminum to bismuth in the periodic table of elements except potassium, calcium, rubidium, strontium, cesium, and barium. The filler is generally from 20 to 400 parts, preferably 50 to about 200 parts per 100 parts of diorganopolysiloxane. Less than 20 parts can be added, but its effect will be very small. The preferred fillers are titanium dioxide, zinc oxide, and ferric oxide. Bartos teaches that $Mn_2O_3$ is a suitable metallic oxide filler.

In U.S. Pat. No. 3,936,476, Itoh et al. disclose silicone compositions containing platinum containing material and manganese carbonate. Finished products prepared by molding the compositions exhibit particularly excellent flameproofing and improved degrees of permanent strain caused by stress. The composition contains from about 5 to about 100 parts by weight of manganese carbonate having a particle size of from about 1 micrometer to about 50 micrometers. Itoh et al. teach that the finely divided manganese carbonate, in cooperation with platinum-containing material, imparts excellent flame-retardant and self-extinguishing properties to the resulting silicone elastomers due to its function of generating $CO_2$ gas under heat as well as its catalytic function. Other carbonates, calcium carbonate, zinc carbonate, and the like, impart no improved self-extinguishing effects to the resulting elastomers.

In U.S. Pat. No. 3,635,874, Laur et al. disclose a flame-retardant silicone composition consisting essentially of 100 parts of polydiorganosiloxane gum, reinforcing silica filler, organic peroxide, platinum, and fume $TiO_2$ having an average particle diameter of less than 0.10 micron. Additional flame-retardant properties are observed by the addition of sulphur free carbon black.

SUMMARY OF THE INVENTION

The addition of from 0.1 to 5 parts by weight of finely divided manganous oxide to a siloxane elastomer base results in improvements in the properties of stocks compounded from such bases. The long term heat stability of the compounded stocks are improved. When flame-retardant additives are used in the composition, the presence of the manganous oxide can improve the flame-retardancy of the cured stock.

DESCRIPTION OF THE INVENTION

This invention relates to a composition comprising 100 parts by weight of polydiorganosiloxane, wherein each organic radical is selected from the group consisting of methyl, vinyl, 3,3,3-trifluoropropyl, and phenyl, there being up to 2 percent vinyl radicals, up to 50 percent 3,3,3-trifluoropropyl radicals and up to 10 percent phenyl radicals based on the total number of organic radicals in the polydiorganosiloxane and from 1.98 to 2.002 organic radicals per silicon atom in the polydiorganosiloxane; from 10 to 100 parts by weight of reinforcing silica filler treated to prevent crepe hardening; and from 0.1 to 5 parts by weight of manganous oxide, the particles of which have a maximum dimension of less than 15 micrometers.

The manganous oxide used in this invention is represented by the formula MnO. It has a molecular weight of approximately 70.94. It is a highly purified material analysing 77.2 weight percent manganese. In order to be effective as an ingredient in a composition, a compounding base, the manganous oxide must be in a finely divided form. The maximum particle size that is useful is approximately 15 micrometers. A material that proved desirable for use in this invention had a particle size analysis that was typically 11.3 weight percent in the 3.8 to 4.8 micrometer range, 13.8 weight percent in the 4.8 to 6.0 micrometer range, 45.5 weight percent in the 6.0 to 7.6 micrometer range, 23.0 weight percent in the 7.6 to 9.5 micrometer range, and the remainder of less than 15 micrometers.

The manganous oxide can show an effect when used in amounts as low as 0.1 parts by weight per 100 parts by weight of polydiorganosiloxane. As much as 5 parts by weight can be used, with a preferred amount being from 0.1 to 2 parts by weight.

The polydiorganosiloxane used in the composition of this invention contains organic radicals selected from the group consisting of methyl, vinyl, phenyl, and 3,3,3-trifluoropropyl, said radicals being bonded to the silicon atoms of the polydiorganosiloxane. The polydiorganosiloxanes are commonly of a viscosity of from 1000 Ps·s up to and including non-flowing gums. These polydiorganosiloxanes are well known in the art and are commercially available.

A siloxane elastomer base contains a reinforcing silica filler to improve the physical strength of the polymer. Reinforcing silica fillers have a surface area of from 150 to greater than 400 $m^2/g$. These reinforcing silica fillers are well known in the art and can be obtained commercially. The reinforcing filler can be treated before use or treated in situ during the manufacture of the siloxane elastomer base. Such treatment is necessary to prevent crepe hardening of the base. The treated reinforcing silica fillers can be treated by any of the conventional methods described in the prior art, wherein the treating agents include organosilanes, organosiloxanes, and silazanes. The amount of reinforcing filler can vary from 10 to as much as 100 parts by weight and the usual amount varying between 10 to 50 parts by weight per 100 parts by weight of the polydiorganosiloxane.

A siloxane elastomer base can also contain additional anti-crepe hardening agents. These anti-crepe hardening agents are used to reduce the reaction between the polydiorganosiloxane and the reinforcing silica that causes the base to become harder or pseudo-vulcanized. Such a reaction can cause the base to become too "nervy" to be of further use.

Suitable anti-crepe hardening agents are well known in the art. They can be such additives as hydroxyl endblocked short chain polydimethylsiloxane fluids. If the reinforcing filler is treated as discussed above, the siloxane elastomer base may not need an additional anti-crepe hardening agent.

The siloxane elastomer base can also contain minor amounts of additives to improve handling, compression set, oil resistance, etc., and further improve the heat stability. A single siloxane elastomer base can be used or a mixture of bases can be used to obtain the desired range of physical properties for a cured siloxane elastomer.

In use, a siloxane elastomer base can be modified with an extending filler to increase the bulk of the composition. This helps to lower the cost of the finished part as the extending fillers are much lower in cost than the siloxane elastomer base.

Siliceous extending fillers used with siloxane elastomer bases are finely ground particles of heat stable inorganic materials with an average particle size of under 25 micrometers. The finest extending filler approach a particle size and configuration such that they have a surface area of as high as 50 m$^2$/g. Examples of siliceous extending fillers include ground quartz, diatomaceous earth, and glass.

The preferred siliceous extending fillers for use with the present invention are ground quartz and diatomaceous earth with the most preferred filler being ground quartz with an average particle size of about 5 micrometers. Extending fillers are useful in amounts as low as 10 parts by weight for 100 parts by weight of polydiorganosiloxane to over 100 parts by weight. Amounts of from 10 to 50 parts by weight are particularly useful in this invention.

The composition of this invention is cured with an organic peroxide vulcanizing agent suitable for vulcanizing the polydiorganosiloxane in the siloxane elastomer base. If the polydiorganosiloxane does not contain any vinyl radicals it must be vulcanized with organic peroxides that are efficient in causing reactions in such polydiorganosiloxanes. Such organic peroxides are labeled "non-vinyl specific" and are represented by such organic peroxides as benzoylperoxide and 2,4-dichlorobenzoylperoxide. If the polydiorganolsiloxane contains vinyl radicals, it can be vulcanized with either "non-vinyl specific" or "vinyl specific" organic peroxides. Representative of the vinyl specific organic peroxides are ditertiary-butyl peroxide, dicumylperoxide, and 2,5-bis-(tert-butylperoxy)-2,5-dimethylhexane. All these organic peroxide vulcanizing agents and their properties are well known in the art. The properties of the vulcanized siloxane elastomer can be altered by the type and amount of vulcanizing agent used to vulcanize the composition. Typical changes due to such choices are well recognized in the art. The vulcanizing agent can be present in amounts of from 0.1 to 5 parts by weight per 100 parts by weight of polydiorganosiloxane, preferably from 0.5 to 2.0 parts by weight.

The compositions of the present invention can also comprise certain additives which are known in the siloxane elastomer art to improve flame-retardancy. These flame-retardant additives include the platinum-containing materials described by Laur et al. in U.S. Pat. No. 3,635,874. The platinum is present in an amount of from 10 to 150 parts by weight per one million parts by weight polydiorganosiloxane. The preferred amount of platinum is from 20 to 80 parts by weight of platinum per one million parts by weight of polydiorganosiloxane. A second flame-retardant additive is fume titanium dioxide described in U.S. Pat. No. 3,635,874 to Laur et al. An effective amount of titanium dioxide is an amount of from 0.5 to 100 parts by weight per 100 parts by weight of polydiorganosiloxane. Preferably the titanium dioxide is added in amounts of from 2 to 25 parts by weight per 100 parts by weight of the polydiorganosiloxane.

A third flame-retardant additive is sulphur-free carbon black as described in U.S. Pat. No. 3,652,488 to Harder. An effective amount of carbon black is an amount from 0.05 to 2.0 parts by weight per 100 parts by weight polydiorganosiloxane. A fourth flame-retardant additive is any of the Group II metal oxides described in U.S. Pat. No. 3,711,520 to Pfiefer et al. The Group II metal oxides include berylium oxide, magnesium oxide, calcium oxide, strontium oxide, barium oxide, and zinc oxide. An effective amount of a Group II metal oxide will depend upon the particular oxide that is used and can vary from 0.1 to 100 parts by weight per 100 parts by weight of polydiorganosiloxane. A fifth flame-retardant additive is any of the rare earth metal oxides or rare earth metal hydroxides described in U.S. Pat. No. 3,821,140 to Milbert. When using rare earth metal oxides, it is possible to use either mixtures of rare earth oxides, or the oxides of one well-defined metal, such as those of cerium $CeO_2$, of lanthanum $La_2O_3$, of praseodymium $Pr_6O_{11}$, or of neodymium $Nd_2O_3$, or of samarium $Sm_2O_3$. Ceric hydroxide, cerous hydroxide, lanthanum hydroxide, neodymium hydroxide, praseodymium hydroxide, and samarium hydroxide are examples of rare earth metal hydroxides that can be used separately or as a mixture. The rare earth metal oxide is employed at the rate of 3 to 35 parts by weight and preferably 5 to 25 parts by weight per 100 parts by weight of polydiorganosiloxane. The rare earth metal hydroxides are present in from 0.5 to 8 parts by weight, preferably 2 to 6 parts by weight per 100 parts by weight of polydiorganosiloxane.

Another flame-retardant additive is an aromatic acid selected from the group consisting of mononuclear aromatic acids and halogenated mononuclear aromatic acids as shown in U.S. Pat. No. 3,996,188 to Laur. From 0.01 to 1.0 parts by weight of aromatic acid per 100 parts of polydiorganosiloxane is effective when an alcohol-producing organic peroxide is used to cure a composition of the instant invention.

The triazole compounds disclosed by Hamada, et al. in U.S. Pat. No. 4,087,399 are also effective flame-retardant additives in amounts of from 0.05 to 1.0 parts by weight of triazole per 100 parts by weight of polydiorganosiloxane.

A composition of this invention can contain an effective amount of any one or any mixture of the additives selected from the above flame-retardant additives. When mixtures of the additives are used, reduction of the amounts of the individual flame-retardant additives is possible because such mixtures appear to have synergistic effects. Such an effective mixture of the present invention contains as little as 0.4 part by weight of fume titanium dioxide, 20 parts by weight of platinum per one million parts by weight of polydiorganosiloxane, and 0.01 part by weight of benzotriazole per 100 parts by weight of polydiorganosiloxane when used in conjunction with manganous oxide in a composition of this invention.

The mixing step used to prepare a composition of this invention can be any suitable means that will lead to a homogeneous mixture of the several components. Methods of mixing that are common in the siloxane elastomer art and which are suitable for this invention include mixing with a dough mixer, a rubber compounding mill, or with a Banbury mixer. The order of mixing is not critical. Ordinarily the polydiorganosiloxane is placed in the mixer, anti-crepe aging additives are added if necessary, then the reinforcing silica is mixed into the composition. The manganous oxide is added and uniformly dispersed. If desired, the mixture can be heated under a vacuum to remove any volatile products that may be present and to aid in the "wetting" of the reinforcing silica by the polymer. After cooling, the mixture is known as a base.

The base can be further compounded by mixing in extending fillers; additives to improve heat stability, antioxidants, processing aids, pigment, flame-retardants, etc; and an organic peroxide vulcanizing agent.

The compositions can be formed into a desired configuration before curing by any of the well known methods of shaping elastomeric curable compositions such as press molding, injection molding, calendering, and extruding, both supported and unsupported.

The shaped compositions of this invention can be vulcanized by any suitable means that will cause decomposition of the organic peroxide vulcanizing agent. Heating is the preferred method. The time and temperature necessary to cause vulcanization of the composition is dependent upon the organic peroxide vulcanizing agent chosen, the method of heating, the method of shaping the composition to the desired configuration, and the thickness of the part. The temperature that is appropriate for a given set of conditions is well known in the siloxane elastomer art. Typical temperatures are from 110° C. to 175° C. for molding operations to as high as 300° C. for the ovens used in continuous hot air vulcanization operations.

The compositions of this invention are useful in the production of cured siloxane elastomeric products that have enhanced properties. The heat stability of the products is improved by the addition of manganous oxide in the finely divided form. The flame-retardancy of the products can be improved by the addition of manganous oxide in the finely divided form.

The following examples are included for illustrative purposes only and should not be construed as limiting the invention which is properly delineated by the claims. All parts are parts by weight.

EXAMPLE 1

A. A compounding base was made by mixing in a dough mixer 100 parts of a dimethylvinyl endblocked polydiorganosiloxane gum having, as a percentage of all organic radicals in the gum, 99.848 percent by weight methyl radicals and 0.152 percent by weight vinyl radicals; 7 parts of a hydroxyl endblocked liquid polymethylphenyl-siloxane having about 4.5 weight percent silicon-bonded hydroxyl radicals and about 53 weight percent phenyl radicals; 1.5 parts of a polydiorganosiloxane having methyl and vinyl radicals having about 12 weight percent hydroxyl radical and 10 weight percent vinyl radical; 37 parts of a fumed silica filler having a surface area of about 250 m$^2$/g; and 0.5 part of manganous oxide, finely ground to an average particle size of about 7 micrometers with a maximum particle size of 15 micrometers.

B. A comparative base was made using the identical formulation and ingredients of base A, except the manganous oxide was not used.

Each of the above bases was further compounded by adding 1.4 parts of a paste consisting of 50 weight percent 2,4-dichlorobenzoylperoxide in silicone fluid to yield a curable stock. Samples of each stock were press molded into 1.9 mm thick slabs by pressing and curing for 5 minutes at 116° C. The physical properties of the samples were measured. The durometer was measured according to the procedure of ASTM D 2240. The tensile strength and elongation were measured in accordance with ASTM D 412. The percent retention of each measured property after heat aging was calculated by dividing the value after aging by the original value and multiplying by 100. Table 1 below shows the physical properties observed for the stocks after molding and after heat aging for 5 days at 250° C. Base A, containing the manganous oxide, exhibited less change in properties after the heat aging period.

TABLE 1

| Base | A | B |
|---|---|---|
| Manganous oxide | yes | no |
| As molded properties | | |
| Durometer, Shore A | 48 | 52 |
| Tensile strength, MPa | 9.16 | 10.5 |
| Elongation, percent | 462 | 476 |
| After 5 days at 250° C. | | |
| Durometer, Shore A | 47 | 73 |
| Tensile strength, MPa | 4.64 | 4.86 |
| Elongation, percent | 333 | 77 |
| Percent retention | | |
| Durometer | 97.9 | 140 |
| Tensile strength | 50.6 | 46.1 |
| Elongation | 72.1 | 16.2 |

EXAMPLE 2

Bases A and B of Example 1 were compounded into stocks by mixing 100 parts of base; 20 parts of ground quartz with an average particle size of 5 micrometers; 8 parts of a flame-retardant additive paste consisting of polydimethylsiloxane, ground quartz, fume titanium dioxide, a chloroplatinic acid complex, and benzotriazole; and 1.4 parts of the 2,4-dichlorobenzoylperoxide paste of Example 1.

Samples of each stock were extruded onto No. 14 gauge tin-coated copper wire and vulcanized for 24 seconds at 370° C. Samples of the insulated wire were evaluated for flame-retardancy according to Underwriters Laboratories Standard for Safety UL 62-1968. The flame was applied to the vertical wire 3 different times for 15 seconds each time. The time necessary for the burning insulation to extinguish is shown in Table 2. These values are averages for three test specimens. Both stocks are self-extinguishing in this test.

TABLE 2

| Base | A | B |
|---|---|---|
| Manganous oxide | yes | no |
| 1st flame application seconds | 13 | 11 |
| 2nd flame application seconds | 11 | 8 |
| 3rd flame application seconds | 3 | 6 |
| Length burned, mm | 63.5 | 68.6 |

EXAMPLE 3

The base A of Example 1 was compounded to a stock by mixing 100 parts of base, 20 parts of 5 micrometer ground quartz, and 1.4 parts of the 2,4-dichlorobenzoyl-peroxide paste of Example 1. Cured samples of the stock were evaluated to compare the properties to the requirements of Underwriters Laboratory Standard for Safety UL 62-1968 for Class 22 insulation. The results are shown in Table 3. This stock passes the requirements. The values under the heading UL-62 in Table 3 are the minumum values permitted to pass this standard.

TABLE 3

| Base | A | UL-62 Requirements |
| --- | --- | --- |
| Manganous oxide | yes | |
| As molded properties | | |
| Durometer, Shore A | 57 | — |
| Tensile strength, MPa | 8.08 | 3.4 |
| Elongation, percent | 391 | 100 |
| After 60 days at 210° C. | | |
| Durometer, Shore A | 62 | — |
| Tensile strength, MPa | 5.3 | 3.4 |
| Elongation, percent | 207 | 50 |
| Percent retention | | |
| Durometer | 109 | — |
| Tensile strength | 65.6 | 60 |
| Elongation | 52.9 | 25 |

EXAMPLE 4

Two bases were mixed to evaluate different levels of manganous oxide.

Base C was made by mixing in a dough mixer 100 parts of the polydiorganosiloxane gum of Example 1, 6.5 parts of the liquid polymethylphenylsiloxane of Example 1, 1.0 part of the polydiorganosiloxane having methyl and vinyl radicals of Example 1, 37 parts of the fumed silica reinforcing filler of Example 1, 30 parts of a finely ground calcium carbonate extending filler, 0.4 part of ground polytetrafluoroethylene, 1.0 part of fumed titanium dioxide, 0.3 part of the chloroplatinic acid complex of Example 2, and 0.1 part of the manganous oxide of Example 1.

Base D was identical to base C, except that 0.5 part of the manganous oxide was used.

Each base was then compounded by mixing 100 parts of base with 1.4 parts of the 2,4-dichlorobenzoylperoxide of Example 1. The press cured samples were tested with the results shown in Table 4. The base with 0.1 part of manganous oxide was not self-extinguishing in this test, while the base with 0.5 part of manganous oxide was self-extinguishing.

TABLE 4

| Base | C | D |
| --- | --- | --- |
| Manganous oxide, part/100 parts base | 0.1 | 0.5 |
| As molded properties | | |
| Durometer, Shore A | 52 | 51 |
| Tensile strength, MPa | 7.99 | 7.37 |
| Elongation, percent | 370 | 370 |
| After 5 days at 250° C. | | |
| Durometer, Shore A | 53 | 56 |
| Tensile strength, MPa | 4.62 | 3.82 |
| Elongation, percent | 240 | 220 |
| Flame retardancy | | |
| Average burn time, seconds | >60 | 16 |

TABLE 4-continued

| Base | C | D |
| --- | --- | --- |
| Length burned, mm | 178 | 102 |

EXAMPLE 5

Two bases were produced to compare the effect of the particle size of the manganous oxide.

Base E was compounded as in Example 1, A, except that the manganous oxide was of an average size of between 80 and 200 mesh (between 75 and 180 micrometers). Only 3 weight percent was below 200 mesh (75 micrometers) size, while 43 weight percent was above 80 mesh (180 micrometers).

Base F was compounded as in Example 1, A, using the manganous oxide ground to below 15 micrometers average diameter.

Each base was compounded by mixing 100 parts of base; 3 parts of a flame-retardant additive paste containing platinum, fume titanium dioxide, ceric hydrate, and ground quartz; 30 parts of 5 micrometer ground quartz; and 1.3 parts of the 2,4-dichlorobenzoylperoxide of Example 1.

Samples of each compound were then press molded as in Example 1. The cured samples were tested with the results shown in Table 5.

The ultimate elongation at break of the samples of base E are lower than expected from this formulation. Base E contains manganous oxide of a large particle size, outside the scope of this invention.

The additional additives used in both compositions of this invention may have screened the heat stability improvement due to the manganous oxide.

TABLE 5

| Base | E | F |
| --- | --- | --- |
| Manganous oxide | course | fine |
| As molded properties | | |
| Durometer, Shore A | 58 | 49 |
| Tensile strength, MPa | 6.9 | 7.6 |
| Elongation, percent | 340 | 500 |
| After 60 days at 210° C. | | |
| Durometer, Shore A | 73 | 67 |
| Tensile strength, MPa | 2.6 | 2.4 |
| Elongation, percent | 80 | 130 |
| Percent retention | | |
| Durometer | 125.9 | 136.7 |
| Tensile strength | 37.7 | 31.6 |
| Elongation | 23.5 | 26.0 |

That which is claimed is:

1. A composition comprising 100 parts by weight of polydiorganosiloxane, wherein each organic radical is selected from the group consisting of methyl, vinyl, 3,3,3-trifluoropropyl, and phenyl, there being up to 2 percent vinyl radicals, up to 50 percent 3,3,3-trifluoropropyl radicals, and up to 10 percent phenyl radicals based on the total number of organic radicals in the polydiorganosiloxane and from 1.98 to 2.002 organic radicals per silicon atom in the polydiorganosiloxane, from 10 to 100 parts by weight of reinforcing silica filler treated to prevent crepe hardening, and from 0.1 to 5 parts by weight of manganous oxide, the particles of which have a maximum dimension of less than 15 micrometers.

2. The composition of claim 1 in which there is also present from 0.1 to 5 parts by weight of organic peroxide vulcanizing agent suitable for vulcanizing the composition.

3. The composition of claim 2 in which there is also present from 10 to 100 parts of extending filler.

4. The composition of claim 3 in which there is also present an effective amount of flame-retardant additive.

5. The composition of claim 2 wherein the polydiorganosiloxane is endblocked with dimethylvinylsiloxy units, the reinforcing filler is present in an amount of from 10 to 50 parts by weight, and the manganous oxide is present in an amount of from 0.1 to 2 parts by weight.

6. The composition of claim 5 in which there is also present from 10 to 50 parts by weight of a siliceous extending filler; from 0.1 to 5 parts by weight of organic peroxide vulcanizing agent suitable for vulcanizing the composition; from 10 to 150 parts by weight per one million parts by weight of the polydiorganosiloxane of platinum as an unsupported platinum-containing material as a flame-retardant additive; and an effective amount of at least one additional flame-retardant additive selected from the group consisting of fume titanium dioxide, carbon black, Group II metal oxides, rare earth metal oxides and rare earth metal hydroxides, triazoles, and aromatic acid selected from the group consisting of mononuclear aromatic acids and halogenated mononuclear aromatic acids.

7. A process of preparing a siloxane composition having improved heat stability in the cured form comprising mixing 100 parts by weight of dimethylvinylsiloxy endblocked polydiorganosiloxane wherein each organic radical is selected from the group consisting of methyl, vinyl, 3,3,3-trifluoropropyl, and phenyl, there being up to 2 percent vinyl radicals, up to 50 percent 3,3,3-trifluoropropyl radicals, and up to 10 percent phenyl radicals based on the total number of organic radicals in the polydiorganosiloxane and from 1.98 to 2.002 organic radicals per silicon atom in the polydiorganosiloxane; from 10 to 100 parts by weight of reinforcing silica filler treated to prevent crepe hardening; from 0.1 to 5 parts by weight of manganous oxide, the particles of which have a maximum dimension of less than 15 micrometers; and from 0.1 to 5 parts by weight of organic peroxide vulcanizing agent suitable for vulcanizing the composition to produce a curable homogeneous mixture.

8. The process in accordance with claim 7 further characterized by forming the curable homogeneous mixture into a desired shape and thereafter heating the curable homogeneous mixture to prepare a cured siloxane composition having improved heat stability.

* * * * *